United States Patent Office 2,883,384
Patented Apr. 21, 1959

2,883,384
PRODUCTION OF RESERPINE AND ANALOGS THEREOF

Robert B. Woodward, Belmont, Mass., assignor to Research Corporation, New York, N.Y., a corporation of New York No Drawing. Application May 3, 1956
Serial No. 582,324

21 Claims. (Cl. 260—287)

This invention relates to methods and intermediates for the production of reserpine

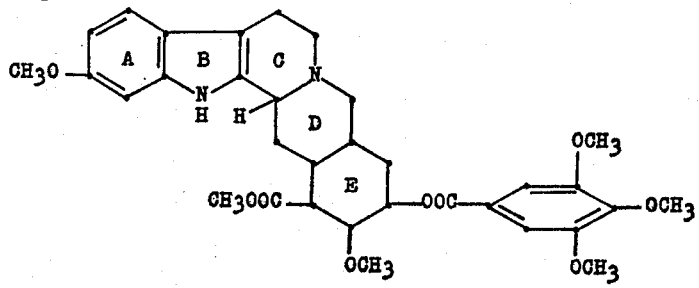

and of analogs thereof.

The sequence of reactions is illustrated in the formula on the following pages and comprises five phases.

Phase I consists in preparation of the basic bicyclic adducts (Ia and Ib) which are the starting materials for the synthesis. The acid adduct (Ia) forms the basis for one method, while the ester (Ib) may be used in an alternative and much shorter method.

Phase II involves the synthesis of the key intermediate (II) which contains all five of the asymmetric carbon atoms of ring E of reserpine, properly oriented substance (II) has been prepared by two methods, more fully described hereinafter.

PHASE II

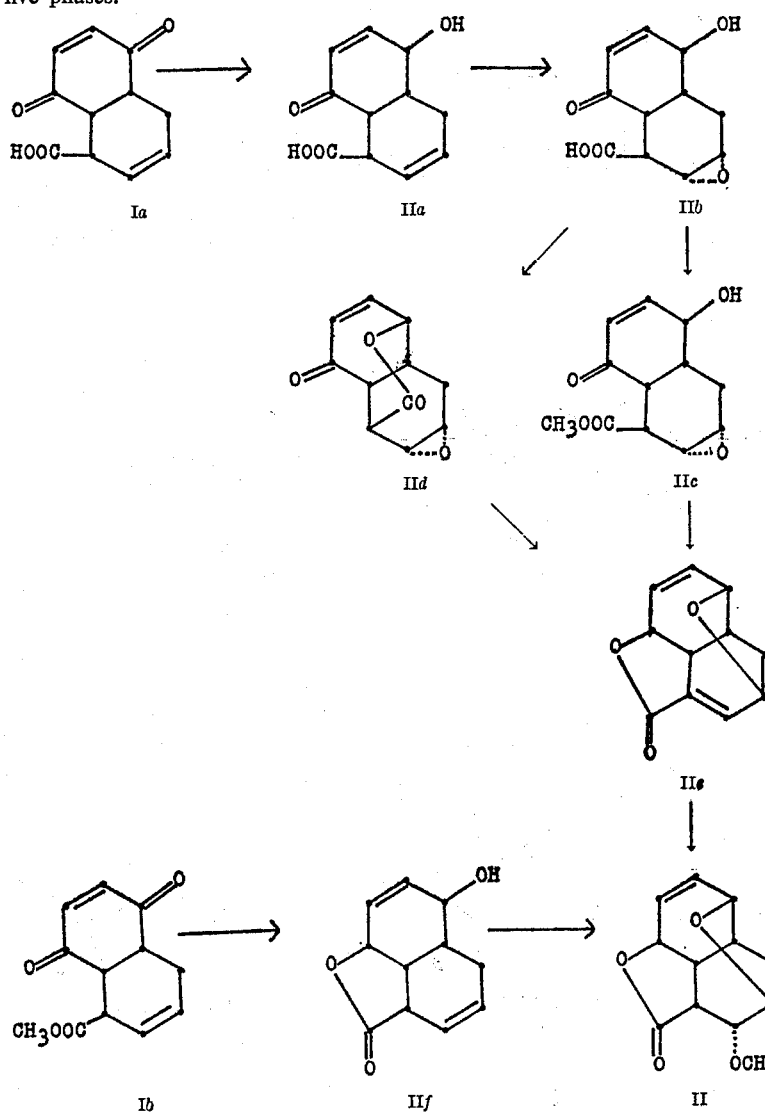

PHASE III
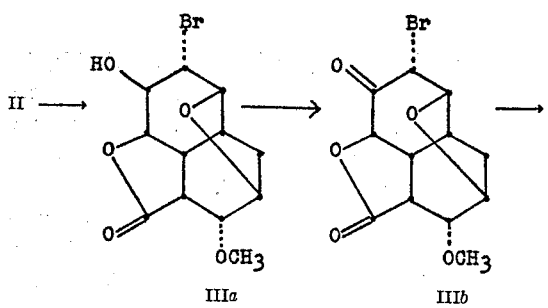
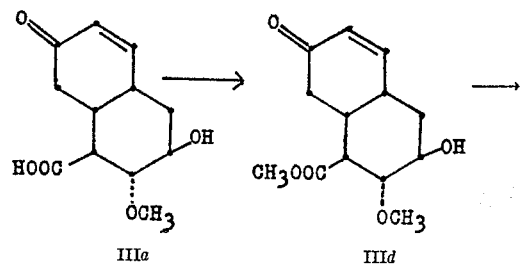
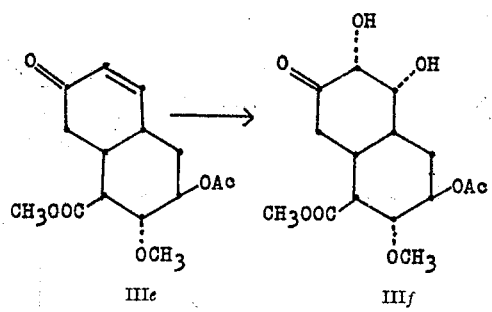
PHASE IV
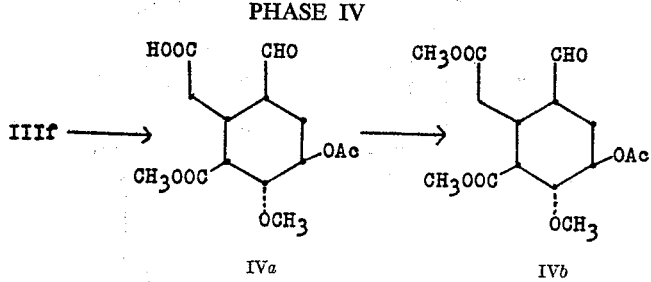
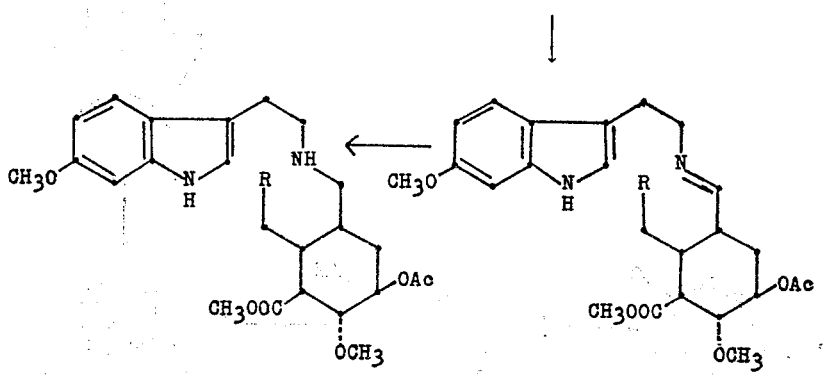

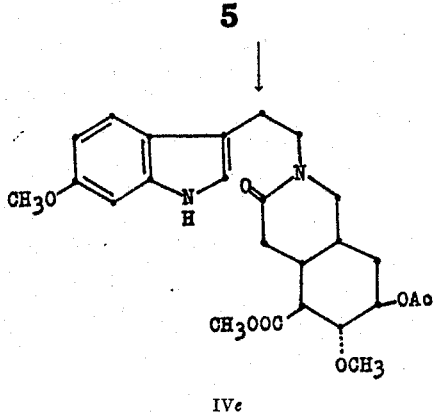

PHASE V

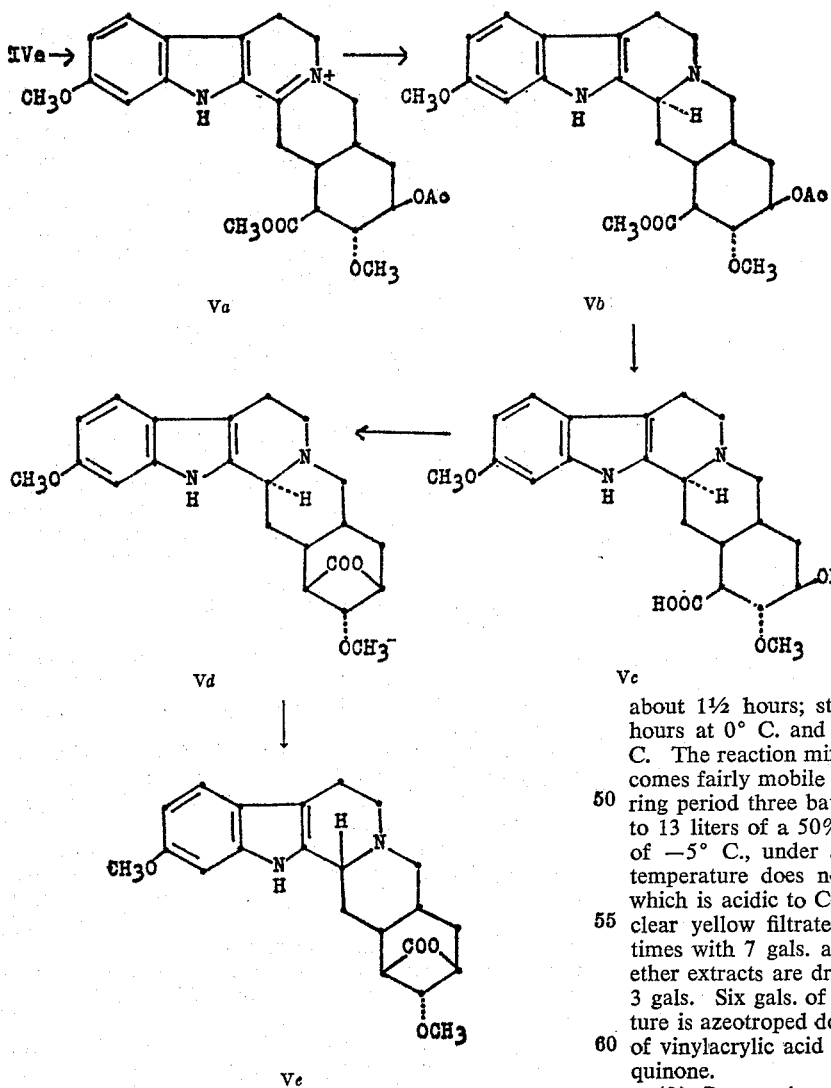

Phase III involves the conversion of intermediate (II) into a substance suitable for cleavage of ring D to form a compound (IIIf) which will condense with the tryptamine component.

Phase IV consists in the cleavage of ring D of the bicyclic intermediate and condensation of the cleavage product. The entire sequence of reactions can be carried out as one operation without isolation of the intermediates.

Phase V includes the closure of ring C of the reserpine skeleton addition of a hydrogen atom at $C_2$, initially to give a substance having the isoreserpine configuration, and inversion of the $C_3$ hydrogen atom to give reserpic acid lactone. The conversion of the latter, through methyl reserpate, to reserpine itself has already been described (L. Dorfman et al., Helv. Chim. Acta, 37, 59 (1954)).

The following specific examples are illustrative of the methods and compounds of the invention.

PHASE I

Preparation of the adducts (Ia) and (Ib)

(1) *Vinylacrylic acid.*—The condensation of malonic acid with acrolein, is carried out as follows: 2000 g. of malonic acid are added to 4.5 liters of pyridine (tech., 0.5% of water) under vigorous stirring. After about 40 minutes the major part of the malonic acid is dissolved. The mixture is then cooled to 10° C. in an ice/salt bath and 1333 g. of acrolein are added at such a rate that the temperature does not exceed 12° C. The addition takes about 1½ hours; stirring is afterwards continued for 3 hours at 0° C. and subsequently for 5 hours at 35–40° C. The reaction mixture is very viscous at 0° C. and becomes fairly mobile at 35–40° C. At the end of the stirring period three batches are combined and slowly added to 13 liters of a 50% (v./v.) aqueous solution of $H_2SO_4$ of —5° C., under stirring and at such a rate that the temperature does not exceed 15–20° C. The mixture, which is acidic to Congo, is filtered through Celite. The clear yellow filtrate is extracted 6 times with ether (3 times with 7 gals. and 3 times with 3 gals. each). The ether extracts are dried over $Na_2SO_4$ and concentrated to 3 gals. Six gals. of benzene are then added and the mixture is azeotroped down to 3 gals. This benzene solution of vinylacrylic acid is directly used for the reaction with quinone.

(2) *Preparation of the adduct (Ia).*—Two gals. of benzene and 3.5 kg. of recrystallized quinone (Eastman-Kodak, practical, extracted with heptane/octane from Soxhlets; the large crystals of quinone should be ground prior to the addition) are added to the benzene solution of vinylacrylic acid. The mixture is refluxed for three hours, then filtered hot (about 45°–50° C.). The filtercake represents 2.3 kg. of gray, crude adduct. The benzene motherliquors are concentrated at normal pressure to about 1½ gals. and again filtered hot. This gives another 700 g. of black adduct. The filtrate is discarded. The two combined fractions of crude adduct (3 kg.) are dissolved under reflux in a mixture of 30 liters of acetone and 30 liters of methanol. 450 g. of norite are added to the clear, dark-red solution and the mixture is kept under reflux for 10 minutes. It is then filtered hot and under pressure through a filter, pre-coated with Celite. The mixture to be filtered is constantly kept at about 50° C. The filtrate is cooled to 10–15° C. and 70 liters of pentane are gradually added under stirring. The adduct crystallizes readily in almost colorless, small prisms. The mixture is stirred at 10–15° C. for 3 hours and then filtered. The filtercake is washed with acetone/pentane (1:2) until it does not darken any more on exposure to air. The product is then washed with pentane and air-dried. Yield: 2 kg., M.P. 215–225° C.

(3) *Preparation of the adduct (Ib).—*

(a) The adduct (Ia) is dissolved in methylcellosolve and treated with one mole of diazomethane in ether. A 40% yield of the ester (Ib) is obtained.

(b) The methyl ester of vinylacrylic acid is obtained by refluxing the crude acid in methanol in the presence of $H_2SO_4$. The ester distills at 57–58° C./1.25 mm. The reaction of the ester with quinone is done in a similar way as in the case of the acid.

PHASE II (1) METHOD 1

Method 1 comprises:

Step I. Reduction of the acid adduct (Ia) to the dihydroderivative (IIa) by sodium borohydride.

Step II. Conversion of (IIa) to the oxide (IIb) by perbenzoic acid.

Step III. Conversion of (IIb) either to the ester (IIc) by diazomethane, or to the lactone (IId) by acetic anhydride and sodium acetate.

Step IV. Conversion of (IIc) or (IId), by aluminum isopropoxide in isopropanol, to the unsaturated lactone (IIe), and addition of methanol to (IIe), to give the desired key intermediate (II).

*Step I*

One hundred g. of adduct (Ia) are added to 750 cc. of water in a 5 liter flask. This mixture is externally cooled in ice and a solution of 42 g. of $NaHCO_3$ in 750 cc. of water is carefully added under vigorous stirring. A little ethyl acetate is added to keep the heavy foam under control. When nearly all the adduct is dissolved, a solution of 16 g. of $NaBH_4$ in a small amount of water is added. Again some ethyl acetate is added to control foaming. The reaction mixture is stirred for 15 minutes. Then about 1.5–2 liters of ethyl acetate are added and the mixture is vigorously stirred. Twenty percent aq. $H_2SO_4$ is added to Congo acidity. The two phases are separated and the aqueous phase extracted 6 times more with ethyl acetate. The combined ethyl acetate extracts are washed once with saturated NaCl solution and dried over $Na_2SO_4$. Upon concentration of the solution, the dihydroadduct (IIa) crystallizes in beautiful prisms, M.P. approximately between 170° C. and 180° C. A total of about 70 g. of product is obtained.

For purification, the dihydroadduct is best dissolved in the smallest possible amount of methanol. An equal amount of water is added and the methanol removed in vacuo. The product crystallizes from the water on standing at room temperature in beautiful, colorless prisms. M.P. 179–180° C.

*Step II*

(a) *Preparation of perbenzoic acid.—*In an 8 liter flask, 52 g. of sodium is dissolved in 1000 ml. of anhydrous methanol, which is then cooled to −5° C. In another flask 500 g. of benzoyl peroxide is dissolved in 2 l. of reagent grade chloroform and cooled to −5° C. The reagents for the subsequent steps are also prepared and cooled to −5° C.

The cooled chloroform solution of benzoyl peroxide is now added to the well stirred sodium methoxide solution (at −5° C.) over a period of approximately 5 minutes, during which time the reaction mixture becomes milky. Following the addition of the benzoyl peroxide, 2 l. of ice water are added (with good stirring to prevent formation of lumps). A white precipitate is formed which gradually dissolves in the aqueous phase. The contents of the flask are now poured into a large separatory funnel. Three liters of ice water are added and the mixture is well stirred. The aqueous phase is washed twice with 1 l. portions of cold chloroform (in order to remove methyl benzoate). Interfacial material is discarded on the second washing. The aqueous solution is now acidified with 2300 ml. of 1 N sulfuric acid (at 0° C.) and the liberated perbenzoic acid is extracted with three 900 ml. portions of benzene. The combined benzene layers are washed with water and dried over sodium sulfate. The perbenzoic acid content of this solution (as determined by titration with thiosulfate and potassium iodide) should be 0.5–0.6 molar.

(b) *Oxidation of IIa.—*The dihydro adduct (IIa) (35.0 g., 0.168 mole) is dissolved (by warming) in 300 ml. of dioxane and to this is added 320 ml. of a 0.605 molar solution of perbenzoic acid in benzene (0.194 mole). The resulting mixture is allowed to stand at room temperature for 25 hours. The solvent is then removed under vacuum to dryness, and the residue is treated with ethyl acetate which causes the product to crystallize. The solid is triturated with ethyl acetate and ether and filtered to give 26 g. of colorless solid, M.P. 156–160° C. The mother liquors are concentrated to give a further 4.0 g. of product, M.P. 150–156° C., or a total yield of 30 g. (80%) of crude product. Further crystallization from ethyl acetate gives the oxide (IIb) as colorless prisms, M.P. 159.5–160.5° C.

*Step III*

(a) Twenty g. of oxide acid (IIb) are dissolved in 200 cc. of warm dioxane. The solution is cooled to 5° C. One mole of diazomethane (in ether) is added and the solvents are immediately concentrated, first at atmospheric, later at reduced pressure, to about 50 cc. After most of the ether is evaporated, the temperature is not allowed any more to exceed 30° C. Ether is added to the concentrated dioxane solution, whereupon crystallization immediately starts. The mixture is kept at 0° C. for 3 hours, then filtered. Yield: 19 g. of pure ester (IIc), M.P. 130–131° C. From the mother liquor another 1 g. of ester may be recovered. Total yield: 20 g.=95%.

(b) A mixture of the oxide acid (IIb) (15.38 g.), 3.1 g. of sodium acetate, 15.5 ml. of acetic anhydride and 300 ml. of benzene are heated under reflux for 4 hours. The flask is cooled, 300 ml. of ethyl acetate and some chipped ice are added and the resulting mixture is washed with 5% sodium bicarbonate. The two phases are filtered from some polymeric material (which hinders separation of the two phases) and the bicarbonate layer is extracted twice with ethyl acetate and finally with chloroform. The combined organic layers are dried over sodium sulfate. Removal of the solvent gives an oil which slowly solidifies. This product is triturated with ethyl acetate and filtered to yield 5.78 g. (41%) of the lactone (IId), M.P. 172–177° C. Further crystallization from acetone gives the lactone as colorless prisms, M.P. 177–177.5° C.

*Step IV*

(a) Twenty-three g. of oxide ester (IIc) and 30 g. of Al-isopropoxide are added to 400 cc. of anhydrous isopropanol. The reaction mixture is stirred and slowly distilled over a Vigreux column. After about 5 hours all the acetone is distilled off. The isopropanol is replaced at the rate it is distilled off. After the reduction is complete, the mixture is kept under gentle reflux for another 2 hours. The solvent is then removed in vacuo to complete dryness. The foamy residue is dissolved in 375 cc. of ethyl acetate, the solution being cooled to 0° C. and added to a solution of 410 g. of NaK-tartrate and 31 g. of NaHCO₃ in 625 cc. of water. The mixture is shaken and the two phases separated. The aqueous phase is extracted 3 times more with ethyl acetate. The combined ethyl acetate extracts are washed twice with NaHCO₃ (ice) and once with saturated NaCl solution. The NaHCO₃ washes are backwashed with ethyl acetate, the ethyl acetate wash being combined with the original ethyl acetate extracts. These combined ethyl acetate solutions are dried over Na₂SO₄ and the solvent is removed to complete dryness. Yield of IIe: 21 g., crystalline, brown mass. This material is dissolved in the smallest possible amount of CH₂Cl₂. The solution was kept at room temperature for 2 hours. A considerable amount of insoluble material separates, which is filtered off and washed with CH₂Cl₂: 3 g. of by-product, M.P. 175–176° C. The filtrate is taken down to dryness and dried in high vacuum. The residue is dissolved in 400 cc. of anhydrous methanol. One hundred-twenty cc. of a methoxide solution is now added and the mixture, which turns brown, is kept at room temperature for 1½ hours. (The methoxide solution is made by dissolving 1 g. of Na in 500 cc. of anhydrous methanol.) The mixture is then neutralized with glacial acetic acid and the solvents are removed in vacuo. The residue, crystalline, is dissolved in CH₂Cl₂ and this solution is washed twice with a small amount of water (backwashed), once with saturated NaCl solution, dried over Na₂SO₄ and concentrated to a small volume. This concentrate is filtered through a short column of neutral alumina (activity 2–3). From the eluate 7.6 g. of pure methoxy-ether (II) is obtained by direct crystallization. The mother liquors are treated once again with methoxide in the same way and give another 700 mg. of methoxy-ether. Total yield: 8.3 g.=39%. M.P. about 100° C.

(b) To a three-neck flask fitted with an efficient stirrer and a short Vigreux column is added 10 g. of the lactone oxide (IId), 29.6 g. of aluminum isopropoxide and 166 ml. of anhydrous isopropyl alcohol. The mixture is heated at such a rate that the acetone distills as it is formed. After 2¾ hours the distillate gives a negative reaction with 2,4-dinitrophenylhydrazine reagent. The reaction mixture is now concentrated to dryness in vacuo and the residue is dissolved in 150 ml. of ethyl acetate. This mixture is now stirred with 300 ml. of a saturated Rochelle's salt solution (containing 66 g. of sodium potassium tartrate and 5 g. of sodium bicarbonate in 100 ml. of water). The aqeous solution is extracted 3 times with ethyl acetate, and the combined organic layers are dried over sodium sulfate. Removal of the solvent gives an oil. This oil may be filtered through deactivated alumina with methylene chloride, the methylene chloride removed under vacuum and the residue crystallized from ethyl acetate-ether to give the unsaturated ether (IIe) as colorless prisms (43% yield), M.P. 124–126° C.

The above oil is dissolved in 260 ml. of anhydrous methanol containing 280 mg. of sodium methoxide and allowed to stand at room temperature for 90 minutes. The reaction mixture is then made acidic with glacial acetic acid and all solvents are removed under vacuum. The residue is taken up in methylene chloride, which is washed with water and then dried over sodium sulfate. The methylene chloride solution is concentrated to about 60 ml. and filtered through a short column of alumina (activity 2–3) with methylene chloride in order to remove some insoluble material. The eluate (about 200 ml.) is concentrated in vacuo to give an oil which slowly solidifies. Crystallization from a mixture of ethyl acetate (5 ml.) and ether (5 ml.) gives 4.98 g. (42.5%) of the methoxy ether (II) as colorless needles, M.P. 95–96° C. Recrystallization from ethyl acetate-ether raises the M.P. to 103–104° C.

(2) METHOD 2

Method 2 comprises:

Step I. Reduction of the ester adduct (Ib) to the hydroxy-lactone (IIf).

Step II. Conversion of (IIf) to (II) by the action of bromine in methanol, followed by sodium methoxide.

*Step I*

Five g. of adduct methyl ester (Ib) and 6 g. of Al-isopropoxide are added to 80 cc. of anhydrous isopropanol and the mixture is slowly distilled over a Vigreux column, under stirring, until no more acetone comes off. The reaction is run under nitrogen and kept anhydrous. When all the acetone is gone (about 40 minutes) the mixture is kept under gentle reflux for another 1½ hours. Then the reaction mixture is concentrated to dryness and the residue taken up in 80 cc. of ethyl acetate. The milky solution is cooled to 0° C. and added to a solution of 83 g. of NaK-tartrate and 6.3 g. of NaHCO₃ in 125 cc. of water. The mixture is shaken and the two phases separated. The aqueous phase is extracted 3 times more with ethyl acetate. The combined ethyl acetate extracts are once extracted with NaHCO₃ (ice added), once washed with saturated NaCl solution, dried over Na₂SO₄ and evaporated to dryness. The crude, crystalline residue (IIf) is recrystallized from acetone/ether. Yield 3.7 g., M.P. 120–122° C.

*Step II*

Five hundred mg. of hydroxy-lactone (IIf) are dissolved in 5 cc. of anhydrous methanol. One mole of Br₂ (417 mg., in 10 cc. of anhydrous methanol) is added and the mixture kept at room temperature for 15 minutes. Then 50 cc. of a methoxide solution (500 mg. of Na dissolved in 200 cc. of anhydrous methanol) is added to the bromination mixture. The solution which turns colorless on the addition of the methoxide again turns dark yellow on standing under nitrogen at room temperature for 1½ hours. The mixture is then neutralized with glacial acetic acid and the solvent removed in vacuo. The residue is dissolved in CH₂Cl₂ and this solution is subsequently extracted once with water, once with NaHCO₃ (ice), once with water and once with saturated NaCl solution. The CH₂Cl₂ solution is then dried over Na₂SO₄ and concentrated in vacuo to a small volume. This concentrate is filtered through a short column of neutral alumina (activity 2–3). The methoxy-ether (II) crystallizes readily upon removal of the solvent. Recrystallization from acetone/pet. ether gives 240 mg. of M.P. 98–101° C. The pure methoxy-ether melts sharply at 105° C.

PHASE III

*Step I*

Seven g. of methoxy-ether (II) are dissolved in 63 ml. of water and 12.6 ml. 1 N H₂SO₄ (under heating to 80° C. and stirring). To this stirred solution is added over a period of 10 min. 5.85 g. of N-bromo-succinimide, the mixture being kept at 60–70° C. during this operation. After all NBS is added, the reaction mixture is maintained for 30 min. at 80°–90° C., until the KI-starch test is practically negative. A small amount of Na₂SO₃ is added to destroy the excess NBS. The aqueous solution is then extracted continuously with dichloromethane for 4 hours. The solvent is then evaporated under vacuum to give 12.92 g. of (IIIa) as a yellow oil.

The bromohydrin (IIIa) may be separated from the succinimide by several crystallizations from acetone to give the desired product as a colorless solid, M.P. 150–151° C.

The above oil (12.92 g.), containing the bromohydrin and succinimide, is dissolved in 53 ml. of hot glacial acetic acid. To the cooled solution (room temperature) is added 5.3 g. of chromic acid (CrO₃ Baker's analyzed, dissolved in 2.7 ml. of acetic acid). The solution becomes warm and after 2 minutes the bromoketone begins to crystallize. The reaction mixture is allowed to stand at room temperature over a period of 10 hours. The solution is then filtered and the crystals are washed with acetic acid and ether. Yield: 6 g. of slightly yellow prisms (60%) of bromoketone (IIIb).

For recrystallization the crude crystals are placed in a Soxhlet apparatus and extracted with acetone. The pure product crystallizes from the acetone directly, M.P. 165–167° C.

Step II

The bromoketone (IIIb) (1.875 g.) is dissolved in 500 ml. of hot glacial acid. To the cooled (17° C.) solution is added 7.5 g. of zinc dust (previously cooled to 0° C.) and the mixture is stirred vigorously for 90 seconds. It is then filtered immediately through Celite, the flask being rinsed with acetone. The filtrates are concentrated to dryness, under vacuum, the residue is dissolved in 25 ml. of water and made basic with solid sodium bicarbonate. This basic solution is extracted continuously with ether for 3 hours to remove 34 mg. of neutral fraction. The aqueous solution is then acidified to Congo red, saturated with sodium chloride and extracted continuously with ether for 14 hours, during which time 1.03 g. of colorless prisms ($\lambda_{max}$ 227 m$\mu$, $\epsilon$=9,750) precipitate from the boiling ethereal solution. The solid is removed by filtration and the filtrates are concentrated to dryness to give a foam which crystallizes on treatment with acetone to yield a further 92 mg. of product or a total yield of 1.12 g. (79%) of the desired product (IIIc).

Step III 3.7 g. of zinc reduction product are dissolved in 150 ml. of abs. dioxane. To the cooled (10° C.) solution are added slowly 40 ml. of a diazomethane solution in ether (1.91% $CH_2N_2$ in abs. ether, made in the usual way from nitroso-methyl-urea and distilled once with ether). The solvent is then evaporated under vacuum at 40° C. The residual oil is dissolved in 10 ml. of acetone and the solution is filtered. The filtrate is evaporated again under vacuum to dryness and the residue crystallized from acetone/ether to yield 3.76 g. (96%) of slightly yellow crystals of IIId, M.P. 134–136° C.

Four further crystallizations from acetone/ether gives an analytical sample, M.P. 139–140° C.

U.V. spectrum: $\lambda_{max}^{225} = \epsilon 11,000$

Step IV 3.40 g. of the methyl ester (IIId) are dissolved in 18.5 ml. of abs. pyridine and 15 ml. acetic anhydride. This mixture is heated over a period of 2 hours at 80–90° C. in a nitrogen atmosphere. The solution is then cooled to room temperature and filtered. The filtrate is concentrated to dryness under vacuum and the residue is crystallized from acetone/ether to give 3.65 g. (92%) of the acetate (IIIe) as colorless prisms, M.P. 135–136° C.

Further crystallizations from acetone/ether gives an analytical sample with M.P. 137–138° C.

U.V. spectrum: $\lambda_{max}^{226} = \epsilon 11,500$

Step V

To a solution of 463 mg. of osmium tetroxide dissolved in 50 ml. of water is added at room temperature 500 mg. of the $\alpha,\beta$-unsaturated keto-acetate (IIIe). The resulting solution rapidly becomes dark blue in color and is allowed to stand at room temperature under nitrogen for 8 hours. The resulting solution is placed in a separatory funnel to which 25 ml. of carbon tetrachloride and 4.15 g. of sodium chlorate has been added. The mixture is shaken vigorously, whereupon the blue coloration rapidly disappears. The aqueous phase is extracted a total of four times with carbon tetrachloride in order to remove all of the osmium oxides. The aqueous solution is saturated with sodium chloride and is then extracted continuously with ether for 8 hours. The ether solution is concentrated to a small volume, benzene is added, and the resulting solution is concentrated to dryness to give 568 mg. of crude product. Crystallization from acetone gave 255 mg. (46%) of colorless needles, M.P. 169–172° C. Further crystallization from acetone-ether gave the product (IIIf) as colorless needles, M.P. 174–175° C.

The acyl group (Ac) in compounds IIIe and IIIf may be any organic carboxylic acid, for example, the lower alkanoic acids, such as acetic or propionic acid, or the aryl carboxylic acids such as benzoic or 3,4,5-trimethoxybenzoic acid (the acyl group of natural reserpine).

PHASE IV

*Oxidation of ketodiol (IIIf) with periodic acid.*—Eight hundred mg. ketodiol (IIIf) (M.P. 169–172° C.) are heated with a solution of 2.30 g. of periodic acid hydrate ($HIO_4 \cdot 2H_2O$) in 126 ml. of $H_2O$ and allowed to stand in a nitrogen atmosphere for 20 minutes at room temperature. The colorless aqueous solution is then shaken 5 times with 50 ml. of ethyl acetate. The organic layers are combined, washed 3 times with a saturated aqueous sodium chloride solution and dried with a large amount of sodium sulfate. The ethyl acetate solution is taken to dryness in a nitrogen atmosphere under reduced pressure at 40° C. leaving a colorless oily residue of IVa.

*Esterification of acid-aldehyde (IVa) with diazomethane.*—The residue (IVa) is taken up in 80 ml. of ether and treated at 0° C. with an excess of a solution of diazomethane in ether. The yellow solution is allowed to stand for 3 min. at 0° C. and is then taken to dryness in a nitrogen atmosphere in vacuo at 30° C. leaving 796 mg. of a slightly yellow oil (IVb).

*Condensation of IVb with 6-methoxytryptamine.*—The foregoing residue (IVb) is taken up in 5 ml. benzene and treated at room temperature with a supersaturated solution of 490 mg. 6-methoxytryptamine (M.P. 142° C.) in 32 ml. of benzene (hot solution quickly cooled down to 20° C. and used before crystallization of methoxytryptamine begins). The solution turns immediately cloudy and is allowed to stand for 3 minutes at room temperature. It is then evaporated to dryness in nitrogen atmosphere at 50° C. in vacuo, leaving a yellowish oily residue of IVc.

*Reduction of IVc with sodium borohydride.*—The residue (IVc) is taken up in 25 ml. of methanol and treated with 250 mg. of solid $NaBH_4$. The reaction mixture is allowed to stand for 6 min. at room temperature and is then heated for 4 minutes on the steam bath. It is concentrated in vacuo to a volume of about 5 ml., treated with several drops of acetic acid to destroy excess borohydride and then with 100 ml. ethyl acetate. The mixture is shaken 4 times with small volumes of 2 N hydrochloric acid. The ethyl acetate layer is washed with saturated sodium chloride solution, dried with a large amount of sodium sulfate and taken to dryness in vacuo: yellowish oily residue.

*Remethylation of reduction product.*—The residue is dissolved in 10 ml. of dioxane and treated at 10° C. with an excess of a solution of diazomethane in ether. The reaction mixture is allowed to stand for 3 minutes at room temperature and is then taken to dryness in vacuo. To remove water, it is heated twice with benzene and concentrated to a small volume. The oily residue is dried in high vacuum: 1.14 g. slightly yellow material.

*Reacetylation of reduction product.*—The foregoing residue (1.14 g.) is heated with 15 ml. absolute pyridine and 10 ml. acetic anhydride and allowed to stand for 12 hours at 30° C. The solution is then taken to dryness in vacuo and the residue is dissolved in chloroform. The chloroform solution is shaken with saturated bicarbonate solution, with 2 N hydrochloric acid and with saturated sodium chloride solution and dried over sodium sulfate. It is then concentrated to a small volume, heated with ether and allowed to crystallize: 923 mg. colorless small prisms of the lactam (IVe) melting at 237–238° C. (The analytical sample melts at 239–240° C.) Yield: 81% (overall).

Reetherification of the acyl group of compound IVd prior to the closure of ring C may be omitted.

While condensation of compound IVb with 6-methoxytryptamine has been shown by way of example, as it introduces the methoxyl in ring A as in natural reserpine, tryptamine itself or substituted tryptamines, for example, lower alkoxy and benzyloxy tryptamines having an unsubstituted hydrogen adjacent the ring nitrogen, may be used instead to give reserpine analogs of various types.

PHASE V

Step I

*Cyclization of lactam (IVe) with POCl₃.*—796 mg. well dried lactam (IVe) (M.P. 237-238° C.) is gently boiled for 2 hours in 20 ml. of freshly distilled phosphorus oxychloride (B.P. 107° C.) under nitrogen. The solution first turns green, then changes to yellow and ends up with a dark orange color. The solution is concentrated in a nitrogen atmosphere under reduced pressure depositing a yellow solid (Va) which is dried in vacuo under nitrogen.

*Reduction of Va with Sodium Borohydride.*—The yellow solid (Va) is dissolved in 20 ml. of 90% methanol and treated portionwise with 210 mg. of solid sodium borohydride. The temperature of the reaction mixture is kept below 30° C. by occasional cooling in an ice bath. The deep orange color of the solution disappears quickly and the product begins to crystallize directly from the reaction mixture in fine needles, and is allowed to stand for 5 minutes at room temperature. After addition of 5 ml. of water and cooling to 0° C., the crystals are filtered off and washed with water. Crystallization from acetone-alcohol gave 536 mg. colorless needles of dl-O-acetyl-isoreserpic acid methyl ester (Vb). M.P. 265-266° C. (evac. Pyrex) (dec.). From the mother liquors 71 mg. less pure crystalline material can be isolated.

Step II.—Resolution of racemic ester (Vb)

300 mg. of dl-methyl O-acetylisoreserpate (Vb) are dissolved in 9 ml. of acetone and heated with a solution of 250 mg. di-p-toluyl-l-tartaric acid in 3 ml. of acetone. The solution is concentrated on the steam bath to a volume of 4 ml. It is seeded with the corresponding natural 1,1-salt and allowed to crystallize. The material which separates is recrystallized from methanol-acetone: 120 mg. colorless prisms.

One further crystallization from methanol gave 98 mg. 1,1-salt melting in an evacuated Pyrex capillary at 153-155° C. This is identical with the corresponding natural salt.

95 mg. of the di-p-toluyl-l-tartrate are treated with 5 ml. 1 N sodium hydroxide and shaken with chloroform. The chloroform extract is washed with saturated sodium chloride solution, dried with sodium sulfate and taken to dryness in vacuo. The colorless residue is crystallized from acetone-ethanol: 37 mg. colorless needles of synthetic 1-methyl O-acetylisoreserpate. M.P. (evac.): 287-288° C. $[\alpha]_D^{24} = -134°$ C., identical with the product from natural sources.

The resolution into the optically active forms may also be effected at an earlier stage of the synthesis.

Step III.—Hydrolysis of methyl O-acetylisoreserpate and preparation of isoreserpic acid lactone Methyl O-acetylisoreserpate (Vb (200 mg.) in 5 ml. of methanol and 1.5 ml. of 40% aqueous potassium hydroxide is boiled under nitrogen for 2 hours. The resulting solution is acidified to Congo red with 1:1 hydrochloric acid, and filtered from the precipitated potassium chloride. The filtrate is concentrated to dryness, boiled with 10 ml. of anhydrous methanol and is filtered from the insoluble potassium chloride. This filtrate is concentrated to dryness, the resulting solid is boiled with 10 ml. of methanol and 2 ml. of acetone. The solution is filtered from a small amount of insoluble material. The filtrate is concentrated (by boiling) to about 4 ml., whereupon the addition of an equal volume of acetone causes the product to separate as colorless needles (131 mg.). The mixture is cooled, filtered, the mother liquors are concentrated to 2-3 ml. and diluted with 5 ml. of acetone to give a further 46 mg. of product. The total yield of hydrochloride of Vc is 177 mg. (92%), M.P. (in vacuo) 273-274° C. (dec.). Further crystallization from acetone methanol gives the product as colorless needles, M.P. (in vacuo), 178-179° C. (dec.).

N,N'-dicyclohexylcarbodiimide (40 mg.) in 4 ml. of dry pyridine and 69 mg. of isoreserpic acid hydrochloride are heated on the steam bath for 60 minutes, during which time a precipitate separates from the reaction mixture. The mixture is allowed to stand at room temperature for 3 hours and is then concentrated to 2 ml., cooled and filtered to give 82 mg. of solid (a mixture of the isolactone and dicyclohexylurea, M.P. 235° C.). The solid is added to 25 ml. of chloroform and the resulting mixture is extracted 3 times with 1 N sulfuric acid. The combined acid fractions are washed with chloroform and then made basic with solid sodium carbonate. The basic solution is extracted three times with chloroform, the combined chloroform layers being dried over sodium sulfate. Removal of the solvent gives an oil which crystallizes on addition of ethyl acetate. The crude product (31 mg.) was recrystallized from ethyl acetate to give 25 mg. (41%) of the isolactone (Vd), M.P. (in vacuo) 222.5-224° C., $[\alpha]_D^{24} = -138°$ C. (c=1.05, chloroform).

Step IV 52 mg. isoreserpic acid lactone (Vd) are refluxed under nitrogen in 2 ml. of a solution of ten volume percent of trimethylacetic acid in xylene for 13 hours. After some hours of boiling, the product starts to crystallize from the boiling solution in long needles. At the end of the reaction time, the solution is cooled down. The crystals are filtered off and washed with benzene: 40 mg. The mother liquor is taken to dryness, treated with some drops of acetone and allowed to crystallize. These crystals are combined with the first crop, dissolved in a small volume of chloroform-methanol (4:1), treated with the same volume of benzene and concentrated on the steam bath until crystallization begins: 41 mg. colorless needles of reserpic acid lactone (Ve), melting in an evacuated Pyrex capillary at 319-321° C. (dec.).

The isomerization of the isoreserpic and lactone is acid catalyzed. A trialkylacetic acid, such as trimethylacetic acid, is preferably used to reduce the possibility of side reactions and to provide a medium in which the product is not highly soluble, but other acids, such as acetic acid, may also be used.

I claim:
1. A compound of the formula

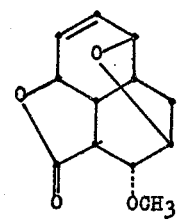

2. The method which comprises subjecting a compound of the formula

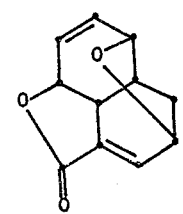

to the action of an alkali metal methoxide to produce a compound of the formula

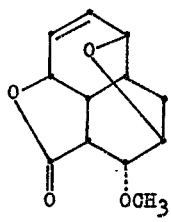

3. The method which comprises heating a compound of the group consisting of the compound of the formula

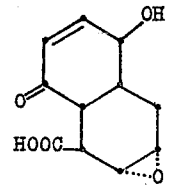

and the lactone and lower alkyl esters thereof with an aluminum alkoxide and subjecting the product thereof to the action of an alkali metal alkoxide to produce a compound of the formula

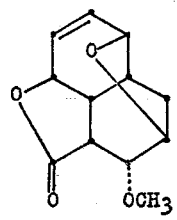

4. The method as defined in claim 3 wherein the aluminum alkoxide is aluminum isopropoxide.

5. Compounds of the formula

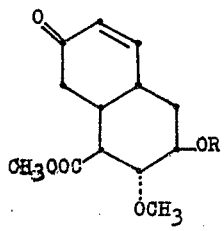

wherein R is selected from the group consisting of lower alkanoic acid radicals and monocyclic aryl monocarboxylic acid radicals.

6. Compounds as defined in claim 5 wherein R is hydrogen.

7. Compounds as defined in claim 5 wherein R is acetyl.

8. A compound of the formula

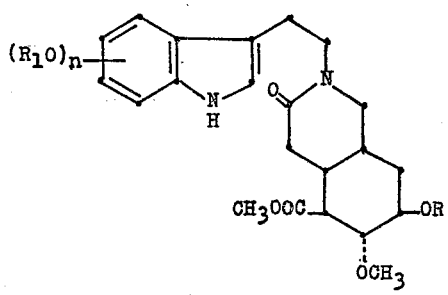

wherein R is selected from the group consisting of lower alkanoic acid radicals and monocyclic aryl monocar-
boxylic acid radicals, $R_1$ is selected from lower alkyl and benzyl, and $n$ is an integer from 0 to 4.

9. A compound as defined in claim 8 wherein R is acetyl and $R_1$ is methyl.

10. A compound as defined in claim 8 wherein R is acetyl, $R_1$ is methyl and $OR_1$ is in the 6-position.

11. The method which comprises condensing a compound of the group consisting of tryptamine and lower alkoxy and benzyloxy substituted tryptamines with a compound of the formula

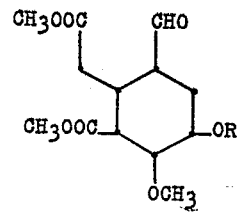

wherein R is selected from the group consisting of lower alkanoic acid radicals and monocyclic aryl monocarboxylic acid radicals to produce a compound of the formula

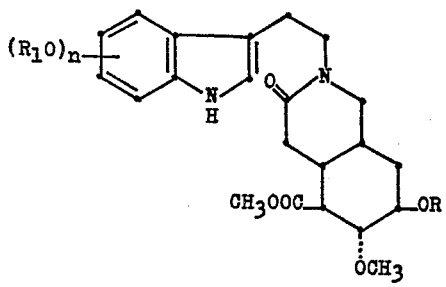

12. The method as defined in claim 11 wherein the tryptamine compound is 6-methoxytryptamine.

13. The method which comprises subjecting a compound of the formula

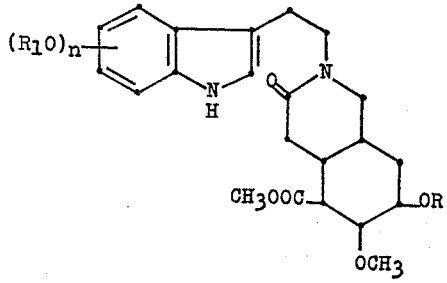

wherein R is selected from the group consisting of lower alkanoic acid radicals and monocyclic aryl monocarboxylic acid radicals, $R_1$ is selected from lower alkyl and benzyl and $n$ is an integer from 0 to 4, to the action of a dehydrating condensing agent to produce a compound of the formula

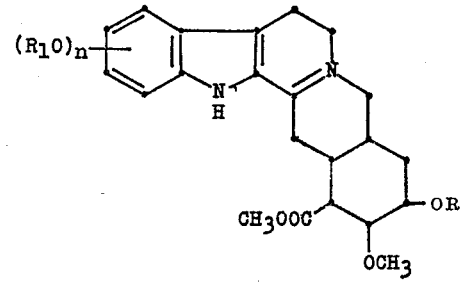

14. The method which comprises subjecting a compound of the formula

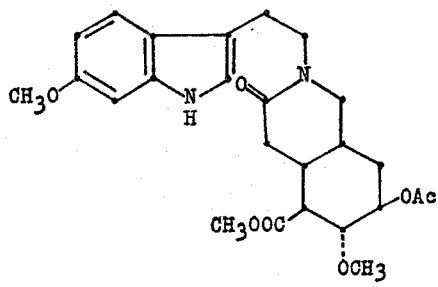

to the action of a dehydrating condensing agent to produce a compound of the formula

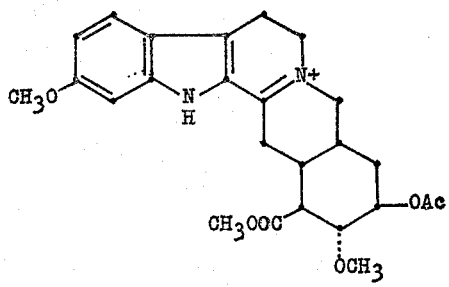

15. The method defined in claim 14 in which the condensing agent is phosphorus oxychloride.

16. A compound of the formula

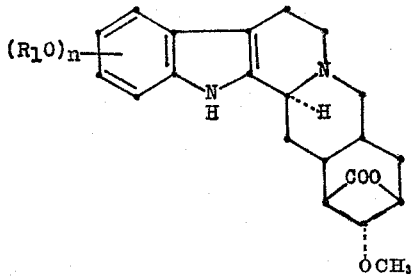

wherein $R_1$ is selected from the group consisting of lower alkyl and benzyl and $n$ is an integer from 0 to 4.

17. Isoreserpic acid lactone of the formula

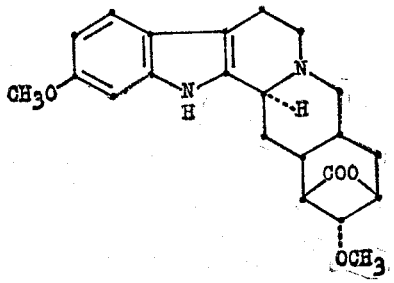

18. A method of isomerizing compounds of the formula

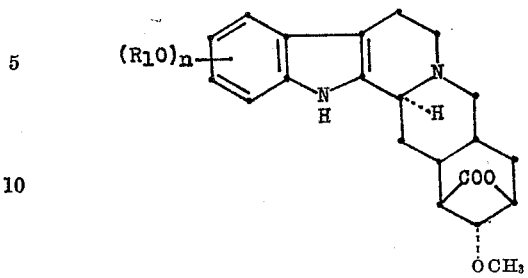

wherein $R_1$ is selected from the group consisting of lower alkyl and benzyl and $n$ is an integer from 0 to 4 which comprises heating the compound in the presence of an acid.

19. A method of isomerizing isoreserpic lactone of the formula

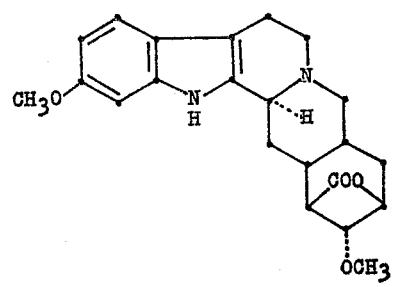

which comprises heating it in the presence of an acid.

20. A method as defined in claim 19 in which the acid is a tri-lower alkylacetic acid.

21. A salt of methyl-acetyl-3-dehydroreserpate having the following formula:

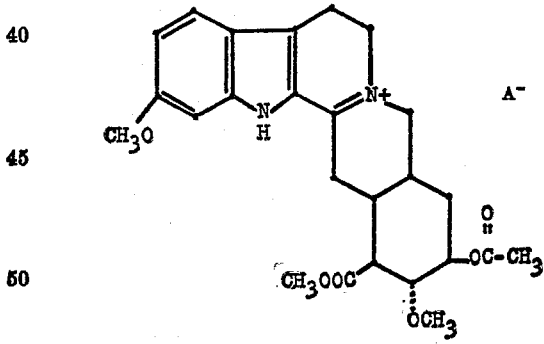

in which A is an anion.

References Cited in the file of this patent

Jour. Am. Chem. Soc., vol. 77, pp. 1071–1072 and 4335–4343 (1955) (MacPhillamy).
Experientia, vol. XI, pp. 303–304 (1955) (Huebner).